(12) United States Patent
Nichols

(10) Patent No.: US 11,117,678 B2
(45) Date of Patent: Sep. 14, 2021

(54) RUNWAY/TAXIWAY LIGHTING SYSTEM

(71) Applicant: AVID Labs, LLC, Fort Wayne, IN (US)

(72) Inventor: Joel A. Nichols, Columbia City, IN (US)

( * ) Notice: Subject to any disclaimer, the term of this patent is extended or adjusted under 35 U.S.C. 154(b) by 0 days.

(21) Appl. No.: 16/885,406

(22) Filed: May 28, 2020

(65) Prior Publication Data
US 2020/0377226 A1  Dec. 3, 2020

Related U.S. Application Data

(60) Provisional application No. 62/853,822, filed on May 29, 2019.

(51) Int. Cl.
| | | |
|---|---|---|
| *B64F 1/20* | (2006.01) | |
| *F21S 8/08* | (2006.01) | |
| *F21W 111/06* | (2006.01) | |
| *F21Y 113/10* | (2016.01) | |

(52) U.S. Cl.
CPC ............ *B64F 1/20* (2013.01); *F21S 8/081* (2013.01); *F21W 2111/06* (2013.01); *F21Y 2113/10* (2016.08)

(58) Field of Classification Search
None
See application file for complete search history.

(56) References Cited

U.S. PATENT DOCUMENTS

| | | | |
|---|---|---|---|
| 2012/0199005 A1* | 8/2012 | Koji ..................... | F24F 3/16 96/224 |
| 2018/0172219 A1* | 6/2018 | Van Bommel .......... | F21V 7/06 |

\* cited by examiner

*Primary Examiner* — Ashok Patel

(57) ABSTRACT

An airport lighting system includes a plurality of lighting fixtures aligned along an airport taxiway and/or an airport runway. Each lighting fixture has a vertically oriented structural member and a lighting member supported by the structural member. The lighting member has an upward emanating light of a visible spectrum and a downwardly emanating light of an invisible spectrum.

10 Claims, 2 Drawing Sheets

RUNWAY/TAXIWAY LIGHTING SYSTEM

CROSS REFERENCE TO RELATED APPLICATIONS

This is a non-provisional application based upon U.S. provisional patent application Ser. No. 62/853,822, entitled "RUNWAY LIGHTING SYSTEM", filed May 29, 2019, which is incorporated herein by reference.

BACKGROUND OF THE INVENTION

1. Field of the Invention

The present invention relates to a lighting system that is part of airport lighting in the form of taxiway and runway lighting.

2. Description of the Related Art

Runway lighting is used at airports that allow night landings. Seen from the air, lights (REIL)—unidirectional (facing approach direction) or omnidirectional (a pair of synchronized flashing lights installed at the runway threshold) one on each side. Runway end lights, which are a pair of four lights on each side of the runway on precision instrument runways, these lights extend along the full width of the runway. These lights show green when viewed by approaching aircraft and red when seen from the runway. Runway edge lights—white elevated lights that run the length of the runway on either side. On precision instrument runways, the edge-lighting becomes amber in the last 2,000 ft (610 m) of the runway, or last third of the runway, whichever is less. Taxiways are differentiated by being bordered by blue lights, or by having green center lights, depending on the width of the taxiway, and the complexity of the taxi pattern.

Runway edge lighting is used to outline the edges of runways during periods of darkness or restricted visibility conditions. Many systems have variable intensity controls, whereas the some have only one intensity setting. At airports where there is a control tower, the tower will manage the lights to account for visibility and pilot preference, but some airports do not have control towers. These airports will have Pilot Controlled Lighting, or PCL, where pilots can adjust the lighting themselves by keying a microphone button a certain number of times.

When an instrument runway lighting is designed, the last 2,000 ft., or one-half of the runway length available (whichever is less), are bi-directional. They look white to the pilot approaching from the short end of the runway, but to a pilot approaching from the other end, who would be landing or taking off in that direction, they are yellow to indicate that the runway is nearing the end Runway centerline lighting system (RCLS) are lights embedded into the surface of the runway at 50 ft (15 m) intervals along the runway centerline on some precision instrument runways. The lights are white except the last 900 m (3,000 ft) have alternate white and red for the next 600 m (1,969 ft) and red for the last 300 m (984 ft).

While markers on runway and taxi surfaces are generally reflective of light, further enhancements have not been undertaken in the airport environment What is needed in the art is a way to enhance ground marking illumination and contrast of those markings in the airport environment.

SUMMARY OF THE INVENTION

Embodiments of the present invention are directed to a lighting system associated with ground lighting and ground traffic lighting at airports.

The invention in one form is directed to an airport lighting system that includes a plurality of lighting fixtures aligned along an airport taxiway and/or an airport runway. Each lighting fixture has a vertically oriented structural member and a lighting member supported by the structural member. The lighting member has an upward emanating light of a visible spectrum and a downwardly emanating light of an invisible spectrum.

The invention in another form is directed to lighting fixtures that can be aligned along an airport taxiway and/or an airport runway. Each lighting fixture has a vertically oriented structural member and a lighting member supported by the structural member. The lighting member has an upward emanating light of a visible spectrum and a downwardly emanating light of an invisible spectrum.

Advantageously, the present invention provides a lighting system that causes ground markers to be of a brighter contrast than that previously experienced at airports.

Additional features and advantages of the invention will be made apparent from the following detailed description of illustrative embodiments that proceeds with reference to the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
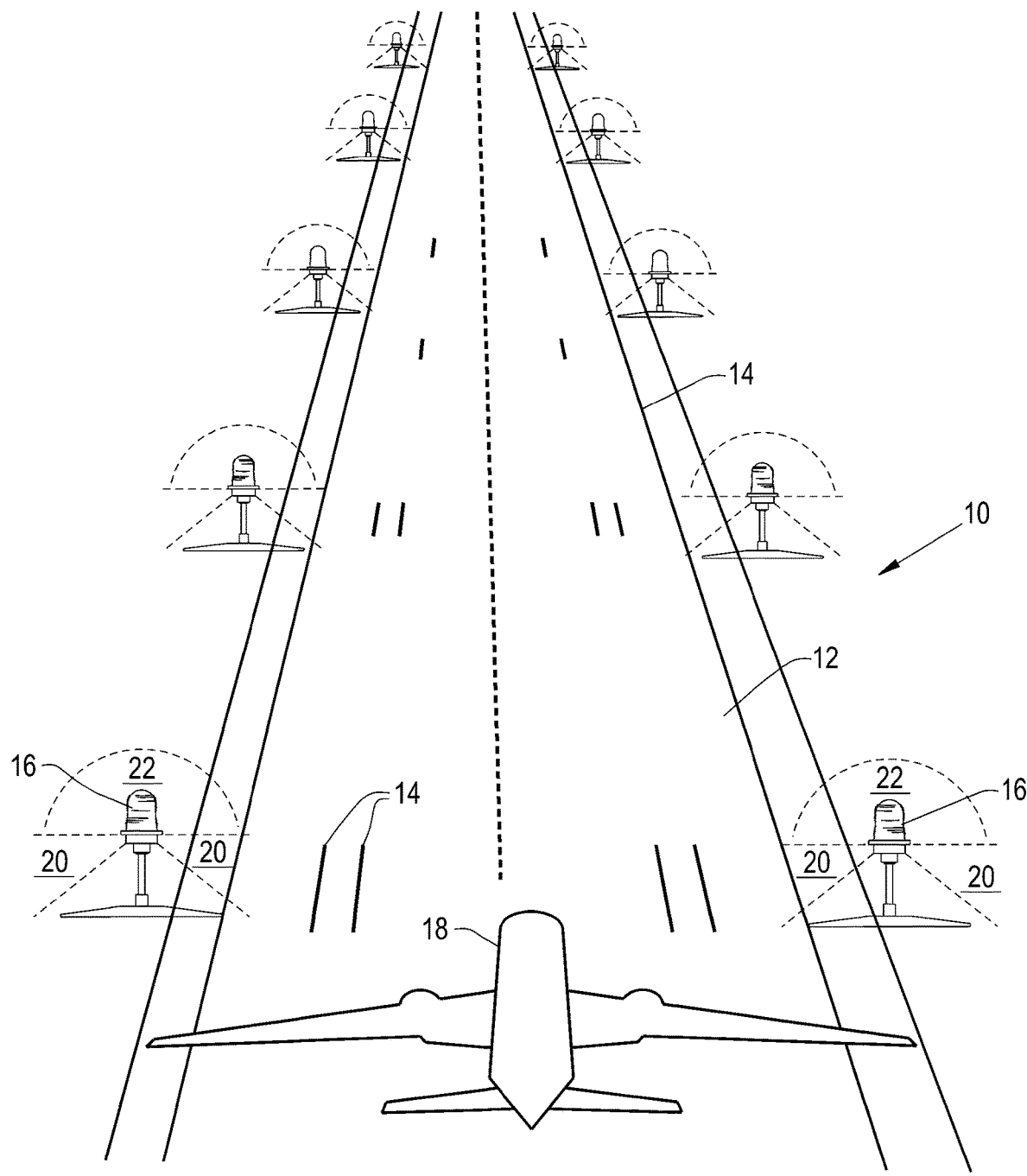
FIG. 1 is a schematical perspective view of an airport runway using an embodiment of a runway lighting system of the present invention.

Referring now to the drawings, and more particularly to FIG. 1, there is shown an airport lighting system 10 including a runway 12 with markers 14, and light fixtures 16. Light fixtures 16 provide illumination of markings 14, as discussed herein, which is observable by the pilot of aircraft 18.

The size of lights 16 are exaggerated in FIG. 1 to illustrate the two differing types of light emanating from lights 16. Additionally referring to FIG. 2, there is shown that a narrow angle (primarily) UV light 20 is projected at a downward angle with the typical white or blue light 22 emanating upwardly. The UV light 20 is directed to interact with the material reflectance of markers 14 so that they will convert the UV light to visible light to enhance the visibility of markings 14 to the pilot of aircraft 18. While UV light 20 is shown as emanating outwardly around lights 16, it is contemplated to direct it only in the directions where markers 14 are located.

The present invention advantageously enhances the visibility of the markers 14 on runway 12.

Airport lighting system 10 includes a plurality of lighting fixtures 16 aligned along airport taxiway 12 and/or an airport runway 12. Each lighting fixture 16 includes a vertically oriented structural member 24 and a lighting member 26 supported by structural member 24. Lighting member 26 has upward emanating light 22 of a visible spectrum and downwardly emanating light 20 of an invisible spectrum.

Markers 14 are positioned generally horizontally along a surface of taxiway or runway 12, at least some of the downwardly emanating light 20 being directed at markers 14. Markers 14 contain material that converts the downwardly emanating light 20 of an invisible spectrum that encounters the material to visible light. Generally markers 14 are arranged on or along the runway and/or taxiway 12. The present invention, by projecting UV light 20 onto markers 14 cause markers 14 to stand out brighter, as perceived by the human eye, since the UV light 20 from fixtures 16 does not illuminate the runway surfaces, but causes markers 14 to emanate visible light in contrast to the surface upon which they lie, hence increasing the light contrast of markers 14, as observed by the pilot.

Figure 2:
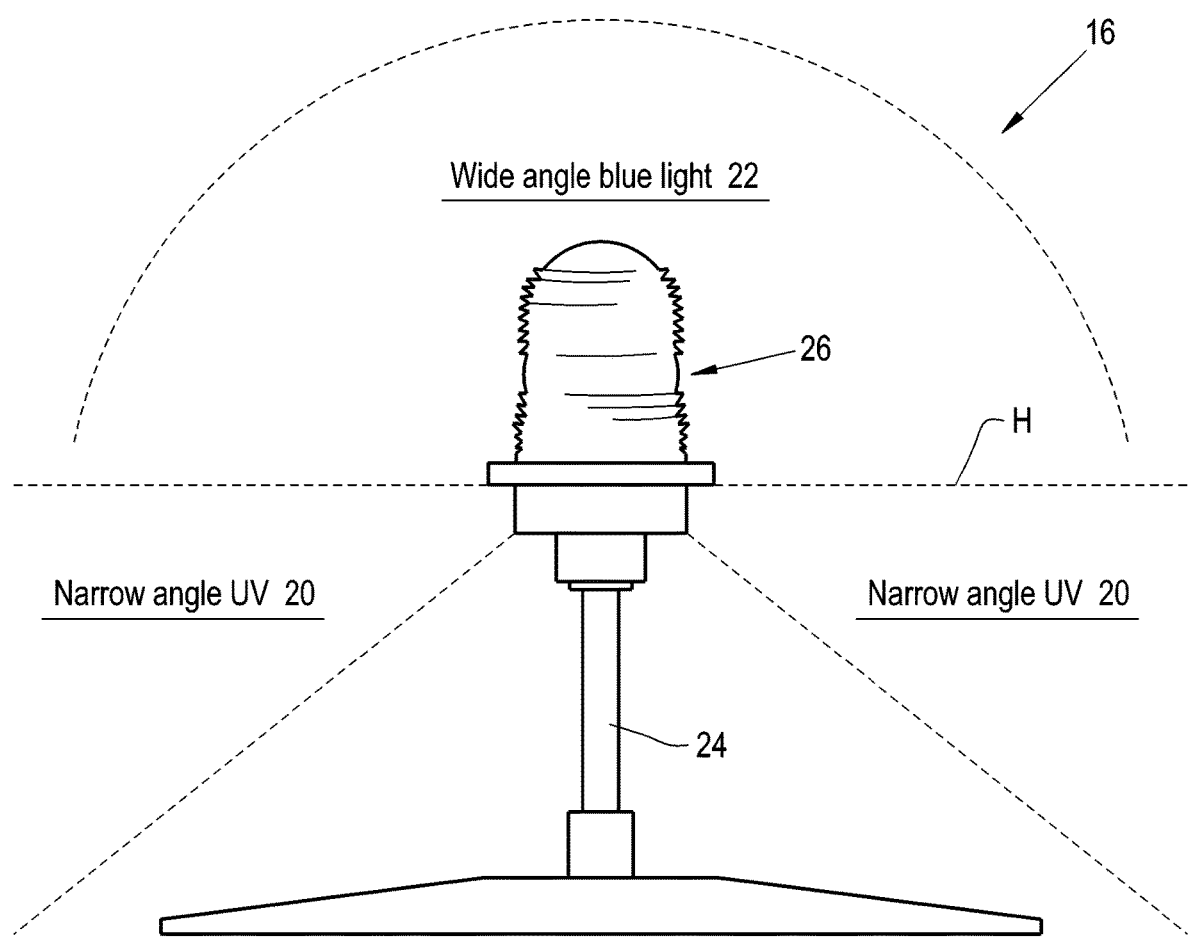
FIG. 2 illustrates details of the lights used in the system of FIG. 1.

It is also contemplated that the downwardly emanating light 20 can be specifically directed toward markers 14 arranged on ground surfaces. Upwardly emanating light 22 emanates at a wide angle, as illustrated in FIG. 2 from lighting member 26. In a complimentary fashion downwardly emanating light 20 emanates at a narrow angle. The narrow angle extends from lighting member 26 approximately horizontally, along horizontal plane H to approximately 45 degrees below horizontal H. The wide angle light 22 extends above the horizontal H. It is also contemplated that some visible light is also projected from lighting member 26 below horizontal H.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An airport lighting system, comprising:
   a plurality of lighting fixtures aligned along an airport taxiway or an airport runway, each lighting fixture including:
   a vertically oriented structural member; and
   a lighting member supported by the structural member, the lighting member having:
   an upward emanating light of a visible spectrum; and
   a downwardly emanating light of an invisible spectrum.

2. The airport lighting system of claim 1, further comprising markers positioned generally horizontally along a surface, at least some of the downwardly emanating light being directed at the markers, the markers containing material that converts the downwardly emanating light of an invisible spectrum that encounters the material to visible light.

3. The airport lighting system of claim 2, wherein the markers are arranged on or along the runway and/or the taxiway.

4. The airport lighting system of claim 1, wherein the downwardly emanating light is ultraviolet (UV) light.

5. The airport lighting system of claim 4, wherein the downwardly emanating light is directed toward markers arranged on ground surfaces.

6. The airport lighting system of claim 1, wherein the upwardly emanating light emanates at a wide angle from the lighting member.

7. The airport lighting system of claim 6, wherein the downwardly emanating light emanates at a narrow angle.

8. The airport lighting system of claim 7, wherein the narrow angle extends from the lighting member approximately horizontally to approximately 45 degrees below horizontal.

9. The airport lighting system of claim 8, wherein the wide angle extends above the horizontal.

10. The airport lighting system of claim 9, wherein visible light is also projected from the lighting member below horizontal.

\* \* \* \* \*